United States Patent [19]

Papa et al.

[11] 4,052,375

[45] Oct. 4, 1977

[54] WATER-SOLUBLE TRISAZOSULFONATED DYESTUFF DERIVED FROM 2-AMINOPHENOL-4-SULFONIC ACID, RESORCINOL, 4,4'-DIAMINOBENZANILIDE AND M-AMINOPHENOL

[75] Inventors: Sisto Sergio Papa; Antonino Condō, both of Milan, Italy

[73] Assignee: Aziende Colori Nazionali Affini Acna S.p.A., Milan, Italy

[21] Appl. No.: 716,117

[22] Filed: Aug. 20, 1976

Related U.S. Application Data

[63] Continuation-in-part of Ser. No. 542,937, Jan. 22, 1975, abandoned.

[30] Foreign Application Priority Data

Jan. 30, 1974  Italy .................................. 19964/74

[51] Int. Cl.$^2$ .......................................... C09B 45/28
[52] U.S. Cl. ................ 260/145 C; 260/142; 260/149; 260/206
[58] Field of Search .................... 260/145 C

[56] References Cited

U.S. PATENT DOCUMENTS

| 2,039,898 | 5/1936 | Gyr ................................. 260/145 C |
| 2,228,415 | 1/1941 | Sparks et al. .................... 260/145 C |
| 2,264,681 | 12/1941 | Rossander et al. .......... 260/145 C X |
| 2,734,051 | 2/1956 | Iselin ........................... 260/145 C X |

FOREIGN PATENT DOCUMENTS

| 2,503,654 | 7/1975 | Germany ....................... 260/145 C |

*Primary Examiner*—Charles F. Warren
*Attorney, Agent, or Firm*—Hubbell, Cohen, Stiefel & Gross

[57] ABSTRACT

A water-soluble triazo dyestuff of the formula:

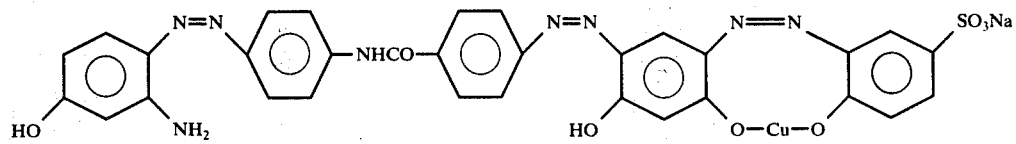

The dyestuff, which is useful in dyeing cotton and other cellulosic fibers, is prepared by diazotizing 2-aminophenol-4-sulfonic acid, coupling the diazotized sulfonic acid with resorcinol, treating the reaction mixture with a copper complexing agent at 35°-40° C and a pH of 5-5.5, separately tetraazotizing 4,4'-diaminobenzanilide, coupling the tetraazotate with the previously formed reaction product to form a diazo-disazoic reaction product, and coupling the latter product with m-aminophenol to produce the desired dyestuff.

1 Claim, No Drawings

WATER-SOLUBLE TRISAZOSULFONATED DYESTUFF DERIVED FROM 2-AMINOPHENOL-4-SULFONIC ACID, RESORCINOL, 4,4'-DIAMINOBENZANILIDE AND M-AMINOPHENOL

CROSS-REFERENCE TO RELATED APPLICATIONS

This application is a continuation-in-part of application Ser. No. 542,937 filed Jan. 22, 1975, now abandoned.

DESCRIPTION OF THE INVENTION

The present invention relates to a new sulfonated triazo dyestuff which is well suited for the direct dyeing of cotton and other cellulosic fibers, such as flax, regenerated cellulose fibers, hemp, jute and the like.

The invention provides a new water-soluble triazo dyestuff having the formula:

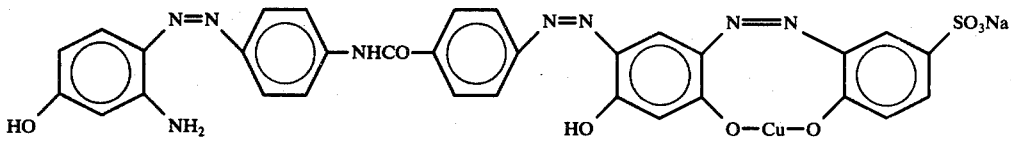

This dyestuff has characteristics which are similar to those of the conventional direct dyestuffs, for example, those of the benzidine series, but the process for its manufacture does not involve toxicological risks. It is prepared by diazotizing 2-aminophenol-4-sulfonic acid, coupling the diazotized sulfonic acid with resorcinol, treating the reaction mixture with a copper complexing agent at 35°–40° C and a pH of 5–5.5, separately tetraazotizing 4,4'-diamonobenzanilide, coupling the tetraazotate with the previously formed reaction product to form a diazo-disazoic reaction product, and coupling the latter product with m-aminophenol.

Moreover, benzidine and its derivatives used in preparing conventional dyestuffs having characteristics which are similar to those of the dyestuff of the invention are hazardous substances, i.e., they are carcinogenic, and consequently require strict and carefully controlled operating conditions.

On cellulosic fibers, the dyestuff of the present invention provides brown-yellowish shaded dyes. Dyeing of fibers with the dyestuff of the invention is carried out using the same methods as are used with conventional direct dyestuffs, i.e., at a temperature generally between 50° and 100° C, in an aqueous bath containing suitable amounts of the dyestuff, e.g., from about 0.01 g to 2–3 percent, as desired, and from 5 to 20 percent (in relation to the weight of the fiber) of anhydrous $Na_2SO_4$ or of NaCl.

The following example is given to illustrate the present invention, all parts being given in parts by weight unless otherwise indicated:

EXAMPLE 18.9 parts of 2-aminophenol-4-sulfonic acid suspended in 150 parts of water and 10.5 parts of 36° Be hydrochloric acid were cooled, using 100 parts of ice, and diazotized, within 30 minutes at 0°–5° C, by dropping thereinto a solution of 7 parts of $NaNO_2$ in 30 parts of $H_2O$. After stirring for 60 minutes, the excess nitrous acid was removed using sulfamic acid.

11.6 parts of resorcinol were dissolved in 70 parts of water and 13.3 parts of 36° Be NaOH. The diazotized mass was poured, over about one hour, onto the obtained solution, while keeping the temperature at 0°–5° C by means of 150 parts of ice, and the pH at about 9 by means of 26.5 parts of 36° Be NaOH. Stirring was carried on for one hour to complete the coupling reaction and then, after admixing a solution of 26 parts of copper sulfate pentahydrate in 80 parts of $H_2O$ at 70° C, 8 parts sodium acetate in $3H_2O$ were added thereto. The whole mass was kept for 3 hours at 35°–40° C, the pH value being 5–5.5. It was salted with 45 parts of rock salt and the resulting precipitate was filtered under vacuum and squeezed dry. The thus obtained cake was treated in 150 parts of water at 40° C and solubilized by adding thereto a solution of 15 parts of $Na_2CO_3$ in 70 parts of $H_2O$ at a pH of about 9.

While keeping the temperature at 0°–5° C by means of 200 parts of ice and the pH at about 9–9.5 by means of 10 parts of $Na_2CO_3$ in the form of a 20% solution (parts/volume), a tetraazotization mass, prepared as hereinafter specified, was added thereto:

22.7 parts of 4,4'-diaminobenzanilide, suspended in 50 parts of water and 52 parts of 20° Be hydrochloric acid, were tetraazotized, after cooling by means of 150 parts of ice, by dropping thereinto, at 0°–5° C in 30 minutes, a solution of 14 parts of $NaNO_2$ in 60 parts of $H_2O$. After stirring for 60 minutes, the excess nitrous acid was removed using sulfamic acid.

Coupling was completed in about three hours.

A solution of 10.9 parts of m-aminophenol in 100 parts of $H_2O$ at 40° C and 1.5 parts of 36° Be NaOH was added to the diazo-disazoic mass, and it was stirred overnight. The temperature was maintained at 10°–15° C and the pH value of 9–9.5 was maintained by addition of 11.3 parts of 36° Be NaOH.

The next morning, the reaction product was salted with 25 parts of rock salt and heated at 70°–80° C for 1 hour.

It was then filtered under vacuum and carefully squeezed dry.

The resulting product, after drying at 70°–80° C, was applicable in dyeing and in printing on cellulosic fibers providing brown-yellowish shades and exhibiting an excellent stability to moisture and sunlight.

Variations can, of course, be made without departing from the spirit and scope of the invention.

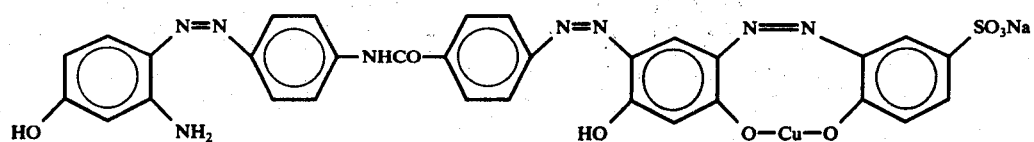

Having thus described our invention, what we desire to secure by Letters Patent and hereby claim is:

1. A water-soluble triazo sulfonated dyestuff having the formula: